(12) United States Patent
Ryu et al.

(10) Patent No.: US 7,557,051 B2
(45) Date of Patent: Jul. 7, 2009

(54) 3-D INTERCONNECTED MULTI-LAYER MICROSTRUCTURE OF THERMOPLASTIC MATERIALS

(75) Inventors: WonHyoung Ryu, Stanford, CA (US);
Seoung Jai Bai, Stanford, CA (US);
Kyle Hammerick, Palo Alto, CA (US);
Robert Lane Smith, Palo Alto, CA (US);
Ralph S. Greco, Stanford, CA (US);
Friedrich B. Prinz, Woodside, CA (US);
Rainer J. Fasching, Mill Valley, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 585 days.

(21) Appl. No.: 11/078,907

(22) Filed: Mar. 11, 2005

(65) Prior Publication Data
US 2005/0206048 A1    Sep. 22, 2005

Related U.S. Application Data

(60) Provisional application No. 60/554,201, filed on Mar. 17, 2004.

(51) Int. Cl.
*H01L 21/00* (2006.01)
*B29C 45/00* (2006.01)
(52) U.S. Cl. .................................. 438/800; 264/328.16
(58) Field of Classification Search ................. 438/800; 264/328.16
See application file for complete search history.

(56) References Cited

U.S. PATENT DOCUMENTS

| | | | |
|---|---|---|---|
| 4,752,352 A | 6/1988 | Feygin | 156/630 |
| 6,598,701 B1 | 7/2003 | Wood et al. | 181/290 |
| 7,315,068 B2 * | 1/2008 | Haubrich et al. | 257/412 |
| 7,347,683 B2 * | 3/2008 | Seki et al. | 425/182 |
| 2002/0182241 A1 | 12/2002 | Borenstein et al. | 424/422 |
| 2004/0044111 A1 | 3/2004 | Kakarala et al. | 524/442 |
| 2004/0178537 A1 | 9/2004 | Polosky | 264/328.16 |

* cited by examiner

Primary Examiner—Lex Malsawma
(74) Attorney, Agent, or Firm—Lumen Patent Firm

(57) ABSTRACT

Methods for compression molding through holes in polymer layers are provided, as are the resulting patterned polymer layers. Two key aspects of the invention are provision of a mold and substrate having different mechanical hardness, and provision of room for local flow of material. These aspects of the invention facilitate formation of through holes by compression molding that are not blocked or partially blocked by undesirable material. These polymer layers can be formed into three dimensional patterned structures by bonding patterned layers together. Since the layers include through holes, a three-dimensional polymer pattern can be formed. These patterned polymer layers and three dimensionally patterned polymer constructs have a wide variety of applications. For example, these constructs can be used for fabrication of micro-fluidic devices, and/or can be used for various medical and biological applications including drug delivery devices and tissue engineering devices.

31 Claims, 9 Drawing Sheets

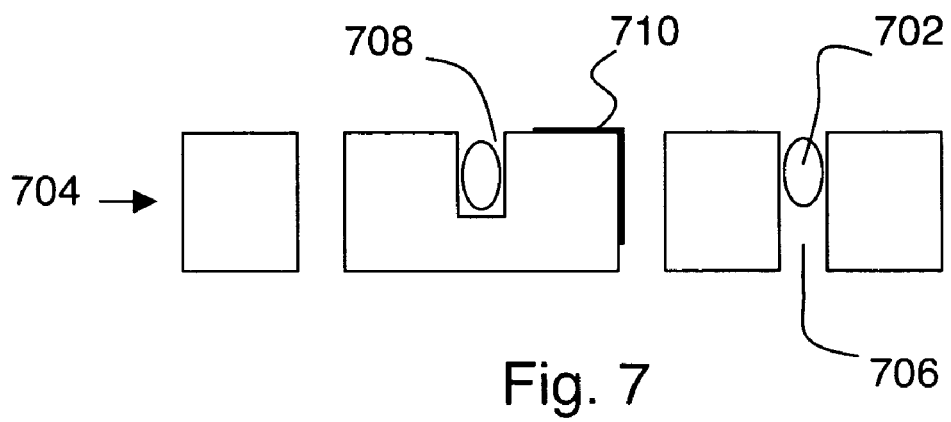
Fig. 7
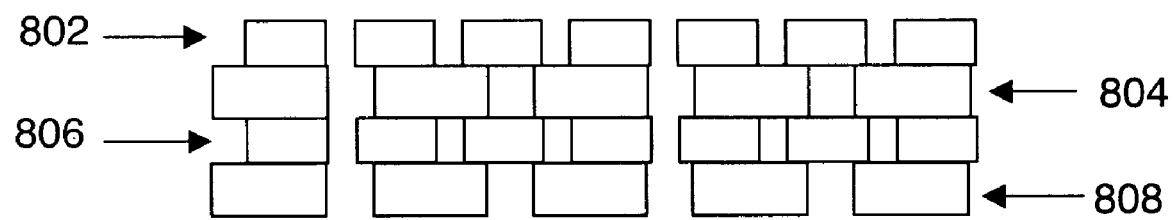
Fig. 8
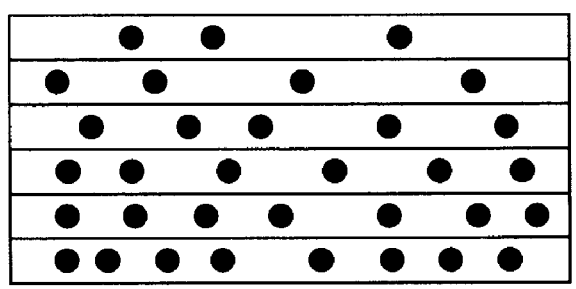 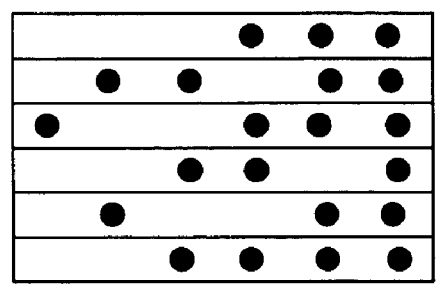
Fig. 9a          Fig. 9b

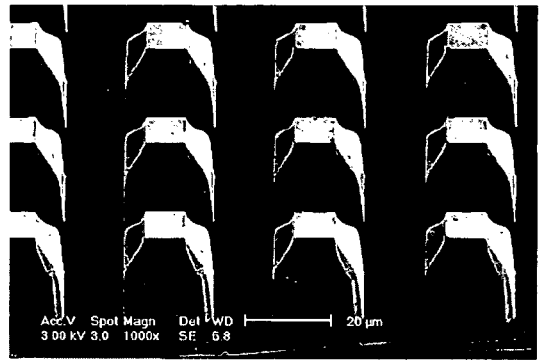 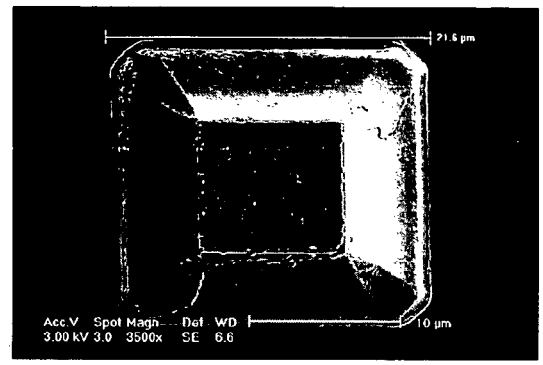
Fig. 10a  Fig. 10b
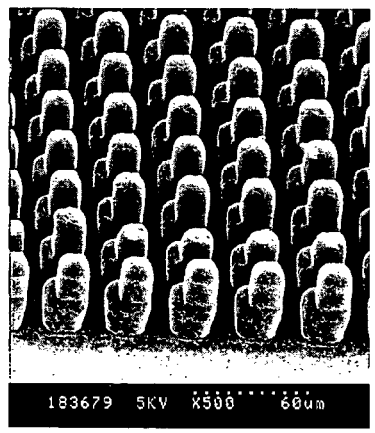 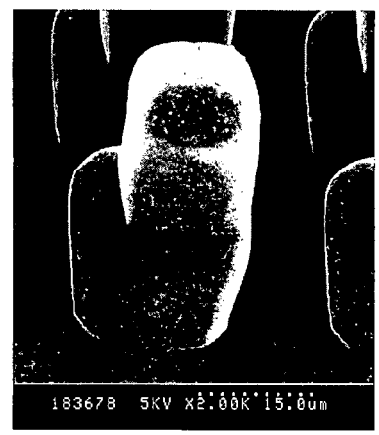
Fig. 11a  Fig. 11b

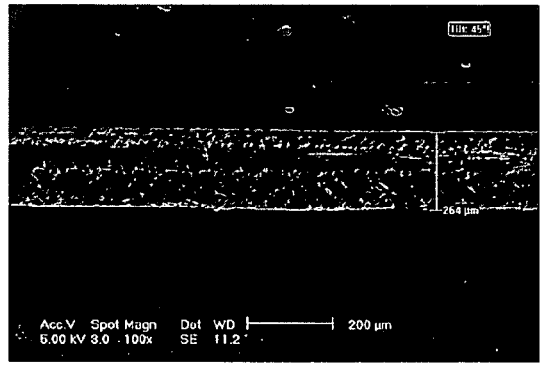
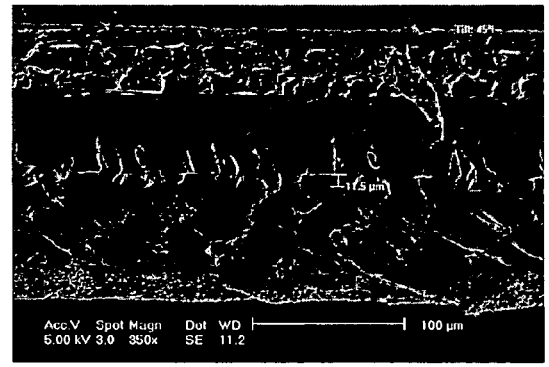
Fig. 14a　　　　　　　　　　Fig. 14b
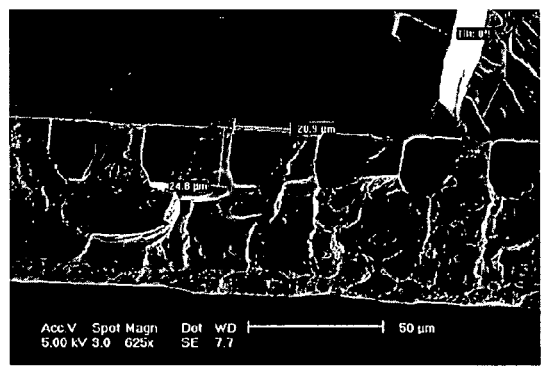
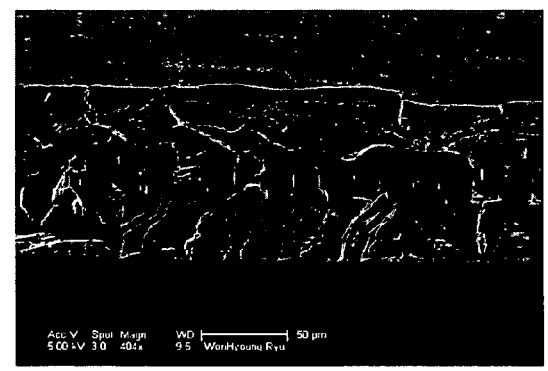
Fig. 15a　　　　　　　　　　Fig. 15b

3-D INTERCONNECTED MULTI-LAYER MICROSTRUCTURE OF THERMOPLASTIC MATERIALS

CROSS REFERENCE TO RELATED APPLICATIONS

This application claims the benefit of U.S. Provisional Application 60/554,201, filed Mar. 17, 2004, entitled "3-D Interconnected Multi-Layer Microstructure of Thermoplastic Materials", and hereby incorporated by reference in its entirety.

FIELD OF THE INVENTION

This invention relates to patterned polymer layers and to three dimensional patterned polymer structures built by bonding stacks of such patterned layers.

BACKGROUND

Various methods are known for fabricating patterns in polymer structures. For example, molding techniques such as injection molding and compression molding are commonly employed methods for making patterned polymer structures. It is often desirable to fabricate a pattern in a polymer structure (or layer) that includes through holes. Fabrication of through holes by molding often provides unsatisfactory results. In particular, the through holes may be partially or even completely blocked by undesired material (sometimes referred to as "flash"). This problem with through holes has been recognized and addressed in the literature. For example, U.S. patent application 2004/0178537 considers injection molding where pins for forming through holes are longer than the cavity depth. Thus the pins are under compression, and the tendency of excess material to remain at through holes is reduced. Alternatively, post-processing is frequently employed to remove the undesired material.

Generally, the problems associated with through hole fabrication become more acute as the size of through holes decreases and as the density of through holes increases. Approaches that are suitable for fabricating a single large through hole (e.g., punching a single hole with a pin) tend to be completely unsuitable for fabricating many closely spaced small through holes, especially in thin layers which can require careful handling to avoid mechanical damage. For example, injection molding (as in U.S. 2004/0178537 above) requires careful attention to detail in order to avoid formation of voids or trapped air bubbles in a polymer film as a result of injection into the mold. As the through hole size decreases and/or as through hole density increases, the difficulties of injection molding tend to increase. Similarly, post-processing to remove excess material from through holes is an approach which is less and less attractive as the hole size decreases, since damage to through holes by post-processing is increasingly difficult to avoid as the hole size decreases.

Patterned polymer layers and structures are under active investigation for various biological and/or medical applications. For example, U.S. patent application 2002/0182241 considers three dimensional polymer scaffolds formed by bonding two-dimensionally patterned polymer layers together. In this work, various patterning methods for polymer layers including through holes are mentioned (e.g., casting, stamping and embossing), but the specific difficulties associated with through hole fabrication are not considered.

Further examples in the art of polymer fabrication methods include U.S. Pat. No. 6,598,701, U.S. 2004/0044111, and U.S. Pat. No. 4,752,352. Although these references consider various aspects of polymer fabrication, none of these references provides a method suitable for forming a large number of densely spaced, small, flash-free through holes.

Accordingly, it would be an advance in the art to provide a method of patterning a polymer layer with a pattern including a large number of densely spaced, small, flash-free through holes.

SUMMARY

The present invention provides compression molding of through holes in polymer layers, and the resulting patterned polymer layers. Two key aspects of the invention are provision of a mold and substrate having different mechanical hardness, and provision of room for local flow of material. These aspects of the invention facilitate formation of through holes by compression molding that are not blocked or partially blocked by undesirable material. These polymer layers can be formed into three dimensional patterned structures by bonding patterned layers together. Since the layers include through holes, a three-dimensional polymer pattern can be formed. These patterned polymer layers and three dimensionally patterned polymer constructs have a wide variety of applications. For example, these constructs can be used for fabrication of micro-fluidic devices, and/or can be used for various medical and biological applications including drug delivery devices and tissue engineering devices.

BRIEF DESCRIPTION OF THE DRAWINGS

FIG. 7 shows optional features of a polymer membrane fabricated according to embodiments of the invention.

FIG. 8 shows a polymer multilayer structure fabricated according to an embodiment of the invention.

FIGS. 9a-b show gradients in polymer multilayer structures fabricated according to embodiments of the invention.

FIGS. 10a-b show a hard mold suitable for practicing an embodiment of the invention.

FIGS. 11a-b show a soft mold suitable for practicing an embodiment of the invention.

FIGS. 14a-b show an example of bonding of polymer layers fabricated according to an embodiment of the invention.

FIGS. 15a-b show an example of bonding of polymer layers fabricated according to an embodiment of the invention.

DETAILED DESCRIPTION

Figure 1A:
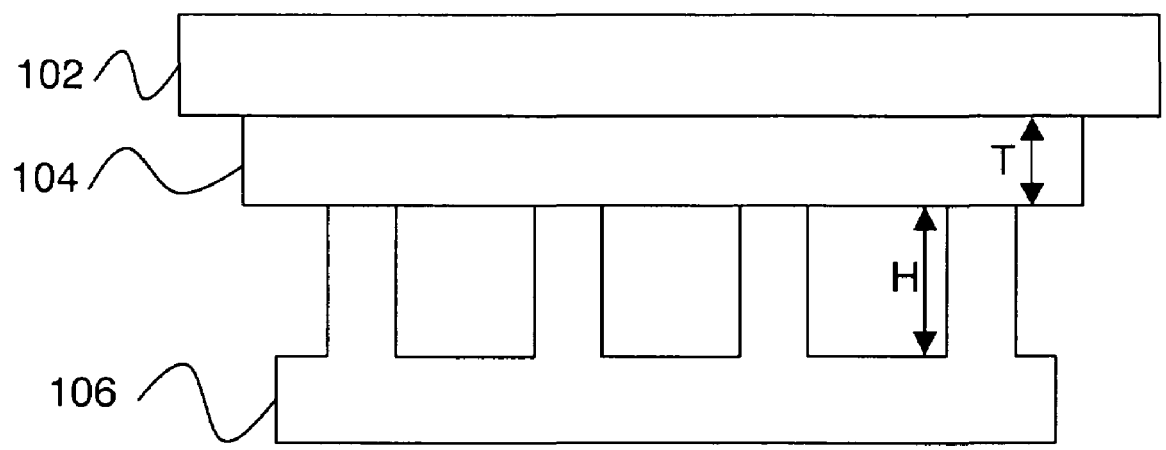
FIGS. 1a-c show steps of a polymer layer molding method according to an embodiment of the invention.
Figure 1B:
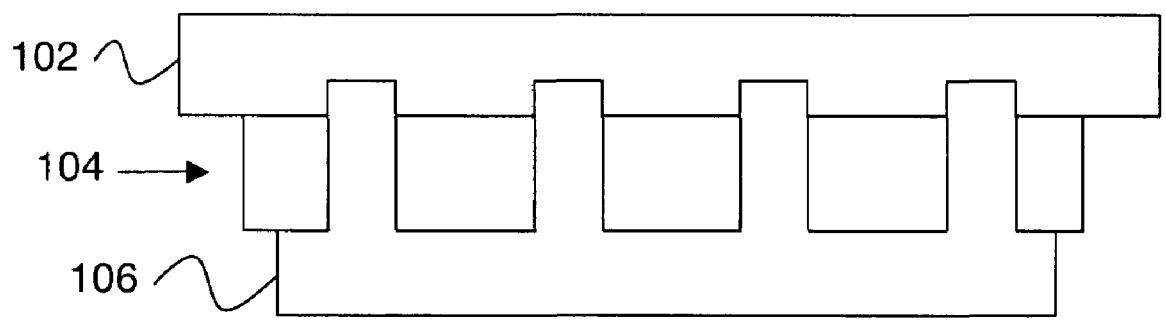
Figure 1C:
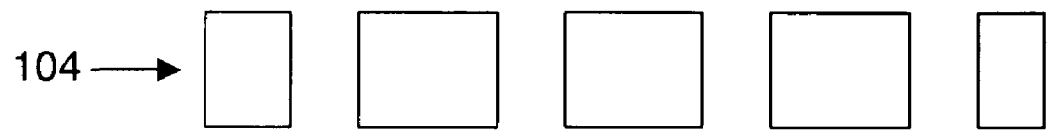

FIGS. 1a-c show steps of a polymer layer molding method according to an embodiment of the invention. More specifically, FIG. 1a shows a polymer layer 104 positioned between a substrate 102 and a mold 106. FIG. 1b shows compression molding of polymer layer 104 by pressing mold 106 and substrate 102 together. Finally, FIG. 1c shows patterned polymer layer 104 after it is released from mold 106 and substrate 102. The view of FIG. 1c is understood to be a side view of polymer layer 104 along a plane that cuts through several through holes. Thus polymer layer 104 is typically a layer with holes through it (as opposed to disconnected fragments), as made clear in the examples of FIGS. 10a-16b.

The preceding brief description of the molding process is a summary that shows that the methods of the invention can all be regarded as variants of compression molding. The following discussion provides many further details of molding according to the invention. Two of these details: differing mechanical hardnesses of mold and substrate; and provision of sufficient room for local flow; are key aspects of the invention. Accordingly, these two aspects will be considered first, followed by a systematic description of other details, embodiments and alternatives.

The first key aspect of the invention is that mold 106 and substrate 102 have different mechanical hardnesses. Preferably, mold 106 is more hard than substrate 102. In this case, as shown on FIG. 1b, hole-forming features of mold 106 will tend to embed into substrate 102. Such embedding is conducive to the formation of flash-free through holes in polymer layer 104. In most cases, it is preferable to be able to use both mold 106 and substrate 102 to perform multiple polymer layer patternings. In these cases, the materials for substrate 102 and mold 106, as well as process parameters (e.g., how deep the features of mold 106 embed into substrate 102) are preferably selected such that the embedding shown on FIG. 1b does not mechanically damage mold 106 or substrate 102. Mechanical damage is avoided if strains within molds 106 and substrate 102 remain within the elastic limit. Methods for ensuring compression molding processes remain within the elastic limit of mold 106 and substrate 102 are known in the art. Alternatively, substrate 102 can be harder than mold 106. In this case, hole-forming features of mold 106 will undergo compression by direct contact with substrate 102, which will also tend to provide flash-free through holes. In this case as well, it is preferred to avoid mechanical damage to mold 106 and to substrate 102 by remaining within their respective elastic limits. Finally, it is preferable that both mold 106 and substrate 102 be harder than polymer layer 104.

Figure 2:
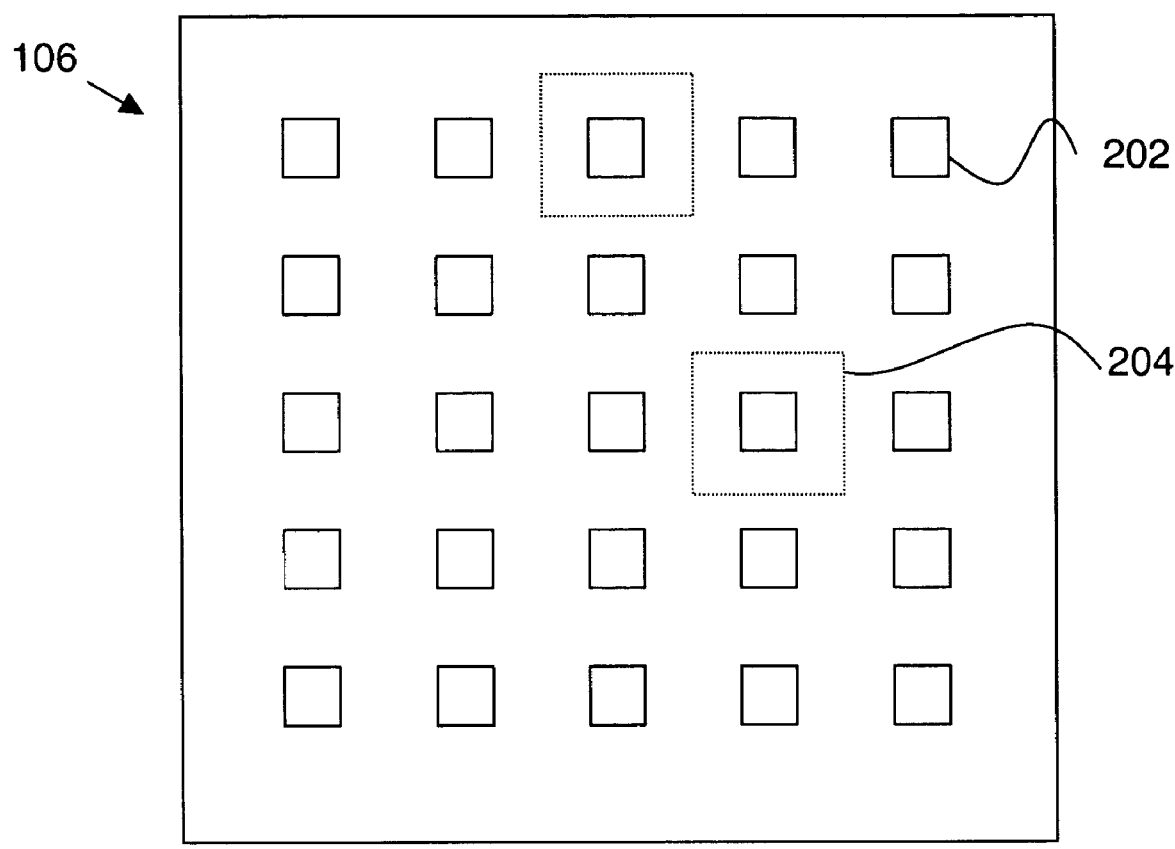
FIG. 2 shows a top view of a mold according to an embodiment of the invention.

The second key aspect of the invention is provision of room for local material flow during compression bonding. This aspect of the invention can be more clearly appreciated by reference to FIG. 2, which shows a top view of a mold 106 according to the invention. The mold of FIG. 2 includes several through hole forming features 202. Associated with each through hole forming feature is a unit cell (e.g., unit cell 204). Although in the example of FIG. 2, the hole forming features are arranged in a regular array, which leads most naturally to a corresponding regular array of unit cells, such regularity of unit cells is not required to practice the invention (even if the features form a regular array). Instead, the requirement for the unit cells of the mold is that substantially all of a surface of the mold facing the polymer layer (e.g., the mold surface shown in FIG. 2) is included in the unit cells, the unit cells do not overlap, and no unit cell includes more than one through hole forming feature. The concept of such unit cells of a mold is introduced in order to discuss "provision of room for local material flow" more clearly, as will be evident from the following considerations.

Consider unit cell 204 having area A. Returning now to FIG. 1a, the thickness of polymer layer 104 is T, and the height of features on mold 106 is H. With these definitions, we can define a unit cell volume V which is equal to A*H in this example. Some of this unit cell volume is occupied (e.g., by a pillar, post, or other pattern-forming mold feature). Let $V_{oc}$ be this occupied volume of the unit cell. It follows that the unoccupied volume of the unit cell is $V-V_{oc}$. The volume of polymer material that is locally associated with unit cell 204 before molding is A*T. Since molding typically does not lead to a permanent volume or density change in a polymer material, the same volume of polymer material (i.e., A*T) is associated with unit cell 204 after molding. There is sufficient room for local material flow at unit cell 204 if $A*T \leq V-V_{oc}$ holds at unit cell 204. By extension, the molding process as a whole provides room for local material flow if the condition $A*T < V-V_{oc}$ holds for every unit cell, where A, V, T, and $V_{oc}$ may vary from unit cell to unit cell, although it is preferred that T be the same for all unit cells and for all unit cells to have the same height H for simplicity.

Further clarification of "local flow" can be obtained by considering an example. Suppose the hole-forming features are square pillars with an L×L cross section arranged on a regular square array with spacing $\sqrt{A}$. Taking the unit cells to be squares of area A centered on the pillars leads to the condition $A*T \leq A*H - H*L^2$. If this condition is not satisfied by mold 106, there is not enough room for local flow. Furthermore, this lack of room for local flow does not depend on how mold 106 is broken up into unit cells. Suppose the above inequality (based on unit cells all having the same size) is violated. It will usually be possible to satisfy the local flow condition at one or even several unit cells (e.g., by making these unit cells bigger by including more empty space for material to flow into). However, such an approach will clearly not lead to satisfaction of the local flow condition at all unit cells, since adding "empty space" to one unit cell to make it satisfy the volume condition necessarily reduces the amount of "empty space" available for all other unit cells. The restriction that no unit cell include more than one through hole forming feature excludes clearly non-local cases, for example a mold having many through hole forming features, where material must flow a long distance laterally (i.e., across several hole-forming features) during molding.

A further noteworthy point is that the unit cells are defined by the mold and substrate together. In the examples shown here, the substrate is flat and has no features, but this lack of substrate features is not required to practice the invention. In cases where both substrate and mold include features, it is convenient to define the unit cells at a point in the molding process where the substrate and mold are just barely touching (i.e., a point analogous to that shown in FIG. 1a.) Here the height of the unit cell H can be regarded as the separation between mold and substrate reference planes, and the occupied volume $V_{oc}$ includes the volume of both mold features and substrate features. The positioning of reference planes in the mold and substrate can be selected arbitrarily for convenience, since the difference between total volume V and occupied volume $V_{oc}$ is not affected by the location of the reference planes.

Polymer 104 is preferably in the form of a thin film of uniform thickness, although alternative forms are possible (e.g., cryogenically ground powder). Polymer 104 can be any thermoplastic polymer. For some applications, polymer 104 is preferably biodegradable. For other applications, polymer 104 is preferably not biodegradable. Suitable materials for polymer 104 include poly-lactides, poly-glycolides, poly methyl methacrylates, aliphatic poly ester, poly-caprolactone, poly-anhydrides, poly ortho esters, alkaly derivatives of Trimethylenecarbonate, δ-valerolactone, β-butyrolactone, γ-butyrolactone, ε-decalactone, hydrocybutyrate, hydroxyvalerate, 1,4-dioxepan-2-one, 1,5,8,12-tetraoxacyclotetradecane-7,14-dione, 1,5-dioxepan-2-one, 6,6-dimethyl-1,4-diocan-2-one and mixtures or co-polymers thereof. The compression molding of polymer 104 is preferably carried out at a temperature above the glass transition temperature, but below the melting point (or thermal damage limit) of polymer 104. In some cases, as indicated later, it is desirable to provide inclusions within polymer 104. In cases where the polymer itself and/or these inclusions are temperature-sensitive, it is preferred for polymer 104 to have a low glass transition temperature (e.g., less than about 100 C), so that processing can be performed at temperatures which do not damage the inclusions and are above the glass transition temperature. For example, 50-50 poly(glycolide-co-lactide) has a glass transition temperature of 50 C, and tetracycline (a common antibiotic) can survive up to 175 C.

Mold 106 can be fabricated from Silicon by standard Si microfabrication techniques. Alternatively, mold 106 can be a micro-patterned metal structure or a micro-patterned polymer structure. Micro- and/or nano-machining technology (e.g., laser micromachining) is also applicable for making mold 106. Mold 106 is preferably treated with a low surface energy surfactant, in order to facilitate release of polymer layer 104 from mold 106. Substrate 102 can be any material which has a substantially different hardness than mold 106. For example, when Si is used for mold 106, suitable materials for substrate 102 include silicone rubber.

The present invention also provides polymer layers having features formed by any of the above methods. Such layers can have feature sizes and densities which are not readily obtainable based on prior art knowledge. Provision of such polymer layers is a major advantage of the invention. For example, through hole lateral feature sizes can be about 100 μm or less (e.g., about 20 μm). Such patterns can be provided on thin polymer films (e.g., polymer layer 104 can have a thickness T between about 1 μm and about 200 μm). Through hole densities can range from about $1/mm^2$ to about $40,000/mm^2$.

The preceding description is by way of example as opposed to restriction, and many variations and modifications of these methods and structures also fall under the scope of the present invention.

Figure 3:
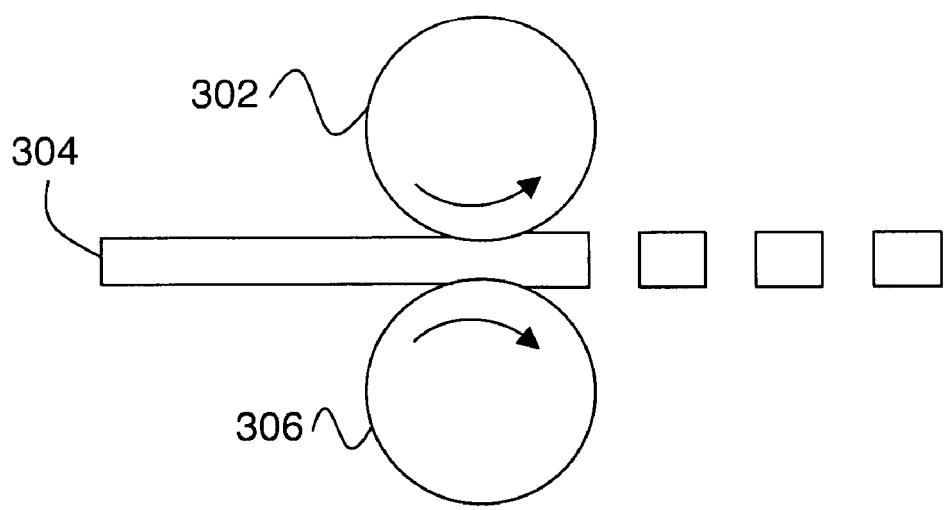
FIG. 3 shows an embodiment of the invention suitable for continuous molding of a polymer layer.

For example, FIG. 3 shows an embodiment of the invention suitable for continuous molding of a polymer layer. In this embodiment, a substrate 302 and a mold 306 are disposed on substantially cylindrical supporting surfaces (e.g., on the lateral sides of a pair of rollers). A polymer layer 304 is fed between the rollers as they rotate and emerges with the pattern imposed by mold 306. By way of contrast, the example of FIGS. 1a-c shows mold 106 and substrate 102 disposed on substantially planar supporting surfaces.

Figure 4:
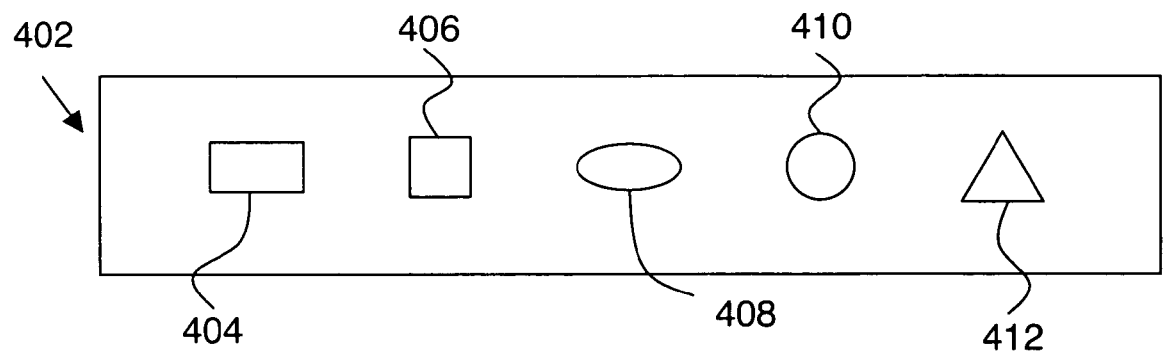
FIG. 4 shows exemplary top-view cross sections of hole-forming mold features according to embodiments of the invention.

Another set of variations relates to the shape of through holes (or of other features such as blind holes) in polymer film 104. Any lateral shape which a feature of mold 106 can be formed into can be imposed on polymer layer 104. FIG. 4 shows exemplary top-view (i.e., lateral) cross sections of hole-forming mold features according to embodiments of the invention. Features 404, 406, 408, 410 and 412 are rectangular, square, elliptical, circular and triangular respectively.

Figure 5:
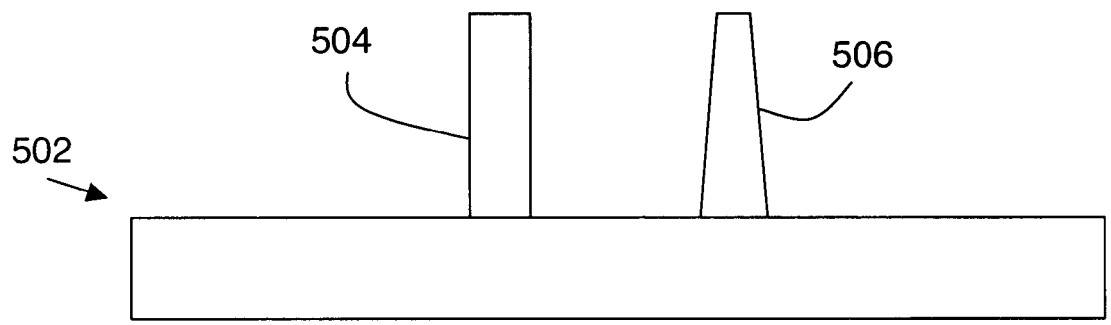
FIG. 5 shows exemplary side-view cross sections of hole-forming mold features according to embodiments of the invention.

Similarly, any longitudinal shape which a feature of mold 106 can be formed into can be imposed on polymer layer 104. FIG. 5 shows exemplary side-view (i.e., longitudinal) cross sections of hole-forming mold features according to embodiments of the invention. Feature 504 is a pillar having straight side walls, and feature 506 is a pillar having tapered side walls. The corresponding through holes formed in polymer layer 104 are straight and tapered respectively. Tapered through holes are of particular interest for certain biological and/or medical applications, since they can act as sieves or traps for certain cells.

Figure 6:
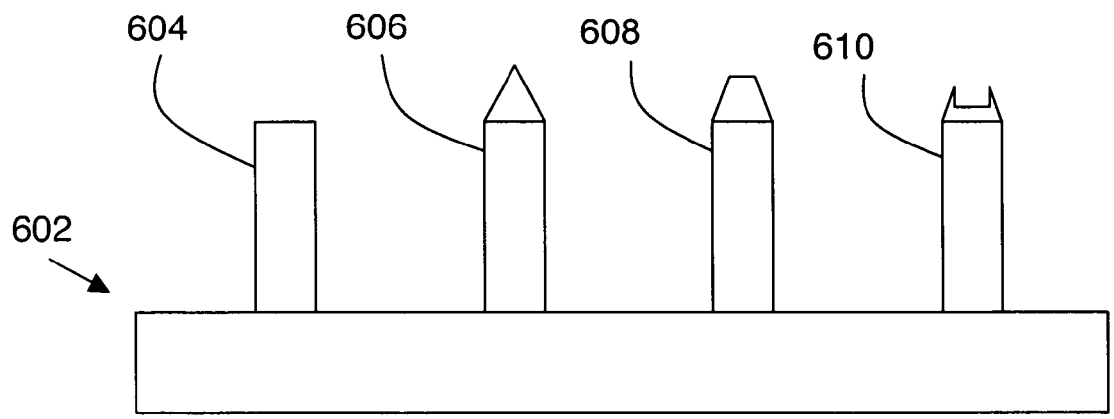
FIG. 6 shows exemplary side-view cross sections of hole-forming mold features according to embodiments of the invention.

Another set of variations relates in particular to the shape of the top section of through hole forming features. FIG. 6 shows exemplary side-view cross sections of hole-forming mold features according to embodiments of the invention. Feature 604 has a flat top, feature 606 has a conical top, feature 608 has a tapered top section with a flat top surface, and feature 610 has a tapered top section with a sharp outer edge. Depending on details of the polymer and process employed, one or the other of these top section shapes may provide improved fabrication of flash-free through holes, and accordingly be preferred.

A polymer layer of the present invention can be enhanced with various optional features, as shown on FIG. 7. An inclusion 702 is shown disposed in a through hole 706 on FIG. 7. Another inclusion 702 is disposed in a blind hole 708. Inclusions in a polymer layer can be bio-active materials (e.g., cells or drugs), bio-active devices (e.g., an insulin pump), non bio-active materials (e.g., fluorescent dye, optical sensor fibers, electrical sensor electrodes) and non bio-active devices (e.g., fiber optic sensor, electrochemical sensor, electrical circuit). Polymer layers of the invention can also include electrical connections to pattern features, such as electrical contact 710 on FIG. 7. Such electrical connections have various uses. For example, included devices can be electrically powered and/or can have electrical input/output. One or more biological cells lodged in an electrically connected pattern feature can be selectively sensed or excited. Such electrical connections can be made by known methods (e.g., low temperature fabrication of appropriately patterned metal).

A further variation of the invention relates to fabrication of three-dimensional structures including patterned polymer layers of the invention. FIG. 8 shows a polymer multilayer structure fabricated according to an embodiment of the invention. In the example of FIG. 8, layers 802, 804, 806, and 808 are each patterned according to an embodiment of the invention, and then the patterned layers are bonded together. The bonding technique preferably does not damage the patterns in the polymer layers. The bonding technique is preferably a low temperature method in cases where temperature sensitive inclusions are present. Suitable bonding methods include solvent bonding, solvent vapor bonding, flash thermal bonding, adhesive bonding, mechanical interlock bonding, plasma bonding or ultrasonic bonding. In some cases, it will be desirable to precisely register features of two (or more) polymer films being bonded. Known registration techniques (e.g., as in semiconductor lithography, mask aligning or wafer bonding techniques) are applicable.

Two bonding methods that have been employed in practice are solvent bonding and flash thermal bonding. A solvent bonding process can be used to dissolve a thin sublayer (i.e., about 1 micron or less in thickness) of a first patterned polymer layer, then a second patterned polymer layer is placed in contact with the dissolved sublayer of the first polymer layer. Such a solvent bonding process can include liquid solvent spraying and/or solvent vapor condensation and/or exposure to a vapor solvent. A flash thermal process (e.g., using a non-contact infrared source) can be used to melt a thin sublayer (i.e., about 1 micron or less in thickness) of a first patterned polymer layer (without substantially affecting the remainder of the first layer), then a second patterned polymer layer is placed in contact with the melted sublayer of the first polymer layer. In either case, damage (and deformation) free bonding is provided that preserves the patterned features in both layers. Repetition of such a process provides a fully three-dimensional polymer construct.

Polymer structures having 3-D patterns according to the invention can be provided with concentration gradients, e.g., as shown on FIGS. 9a-b. The gradient can be in any direction. Two special cases include a gradient perpendicular to the plane of the layers as shown on FIG. 9a and a gradient parallel to the plane of the layers as shown on FIG. 9b. Such gradients can relate to the 3-D pattern itself (e.g., a gradient in the hole density), and/or can relate to inclusions within a uniform or non-uniform 3-D pattern (e.g., a gradient in bio-active material concentration, where the bio-active material is present as inclusions within a pattern). Thus the solid dots on FIGS. 9a-b schematically represent these possibilities. Inclusions within a 3-D pattern can include any combination of bio-active or non bio-active materials, or bio-active or non bio-active devices.

Further aspects of the invention can be appreciated from the following examples.

FIGS. 10a-b show a hard mold suitable for practicing an embodiment of the invention. FIG. 10b is a higher magnification view of the mold of FIG. 10a. The features of the mold of FIG. 10a-b are about 30 µm high and 20 µm×20 µm laterally. The mold of FIGS. 10a-b is a Silicon mold fabricated by conventional semiconductor lithography followed by reactive ion etching. FIGS. 11a-b show a soft mold suitable for practicing an embodiment of the invention. FIG. 11b is a higher magnification view of the mold of FIG. 11a. The features of the mold of FIG. 11a-b are about 30 µm high and 15 µm×15 µm laterally. The mold of FIGS. 11a-b is a silicone rubber (PDMS) mold. The mold of FIGS. 11a-b was fabricated by a casting process. First, a photosensitive polymer resin was patterned by exposure to UV light to form a negative of the desired mold shape. Then silicone rubber (PDMS) was cast in this negative mold to form the desired mold shape. After release from the negative mold, the PDMS silicone rubber mold had the desired shape (i.e., the features shown in FIGS. 1a-b).

Figure 12A:
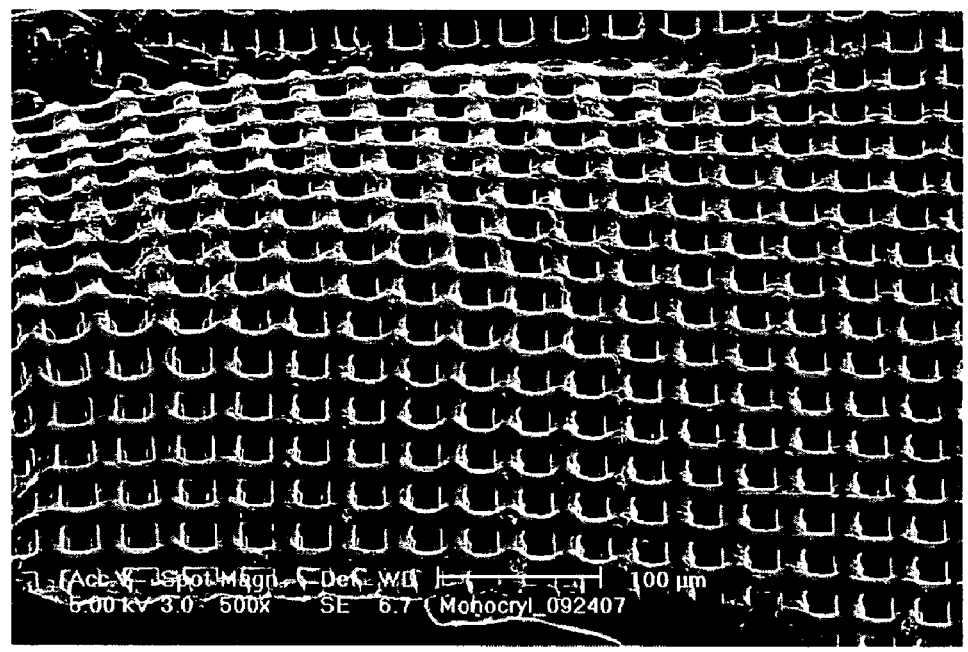
FIGS. 12a-b show an example of a polymer layer fabricated according to an embodiment of the invention.
Figure 12B:
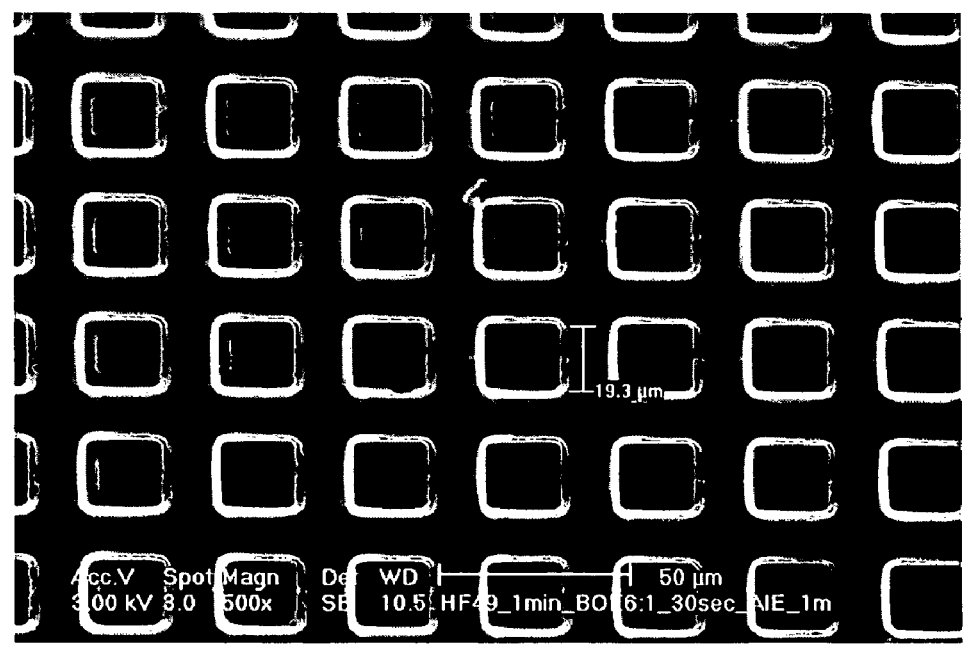
Figure 13A:
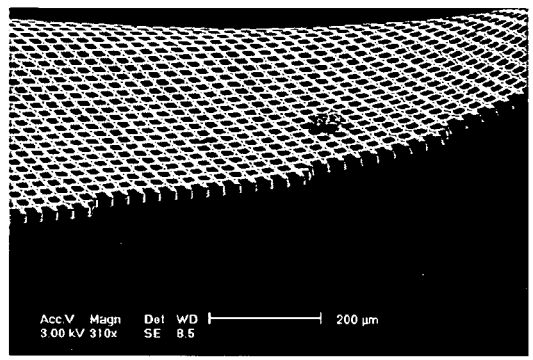
FIGS. 13a-d show an example of a polymer layer fabricated according to an embodiment of the invention.
Figure 13B:
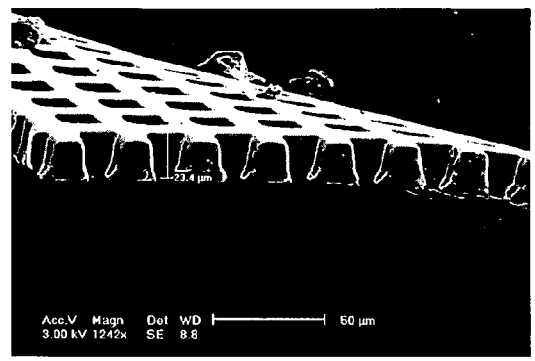
Figure 13C:
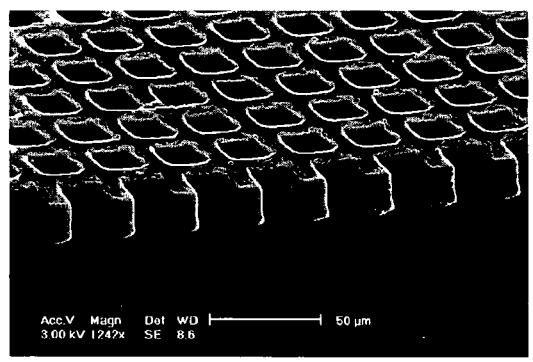
Figure 13D:
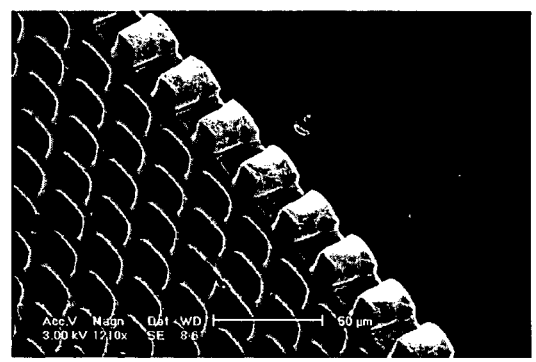

FIGS. 12a-b show an example of a polymer layer fabricated according to an embodiment of the invention. The polymer of this example is 50/50 poly (D,L-lactide-co-glycolide), which is a biodegradable composition. The example of FIGS. 12a-b features polymer layers having through holes formed by a mold having a tapered top section (e.g., like 608 on FIG. 6). FIGS. 13a-d show an example of a polymer layer fabricated according to another embodiment of the invention. The polymer of this example is 50/50 poly (D,L-lactide-co-glycolide). In this example, the through holes are tapered and can act as a sieve. The corresponding mold feature shape is like 506 on FIG. 5.

A noteworthy feature of the examples of FIGS. 12a-13d is that these polymer films have a high density of small, precisely formed through holes. These through holes were formed directly by compression molding according to the invention. No post-molding processing was required to "open up" the through holes by removing flashing or other undesirable material.

FIGS. 14a-b show an example of bonding of polymer layers fabricated according to an embodiment of the invention. The polymer of this example is 50/50 poly (D,L-lactide-co-glycolide). The bonding method is thermal fusion bonding. Two polymer layers were stacked and heated above their glass transition temperature (Tg) under controlled pressure. After dwelling above Tg for a designated time, the stack was cooled down and pressure was released at a temperature below Tg. FIGS. 15a-b show an example of bonding of polymer layers fabricated according to an embodiment of the invention. The polymer of this example is 50/50 poly (D,L-lactide-co-glycolide). The bonding method is solvent spin-spray bonding. A microstructured polymer layer was placed on a spin coater. During low speed spinning of the polymer layer, water diluted solvent was atomized and sprayed onto the polymer layer. Immediately after this spin-spraying process, the layer was stacked with another layer under regulated pressure. A noteworthy feature of the examples of FIGS. 14a-15b is that the polymer film features are not damaged by the bonding techniques employed.

Figure 16A:
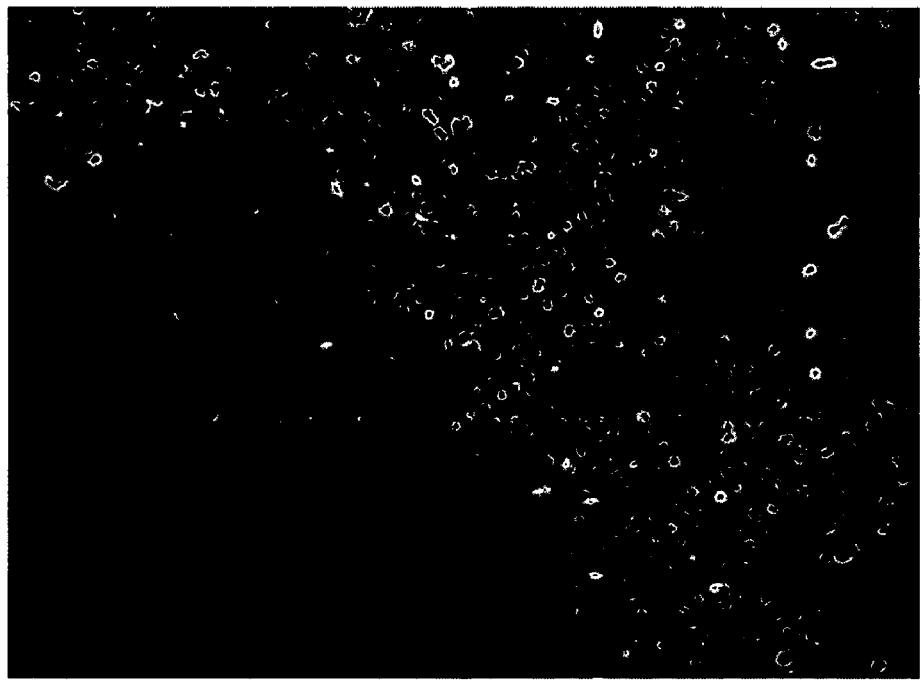
FIGS. 16a-b show an example of cellular inclusions in a polymer layer fabricated according to an embodiment of the invention.
Figure 16B:

FIGS. 16a-b show an example of cellular inclusions in a polymer layer fabricated according to an embodiment of the invention. FIG. 16b shows the structure of FIG. 16a at a higher magnification. The polymer of this example is a copolymer of poly-glycolide and poly ϵ-caprolactone. Each micro cavity in this patterned polymer layer includes hepatocytes.

Micro-patterned polymer structures of the present invention lend themselves to a wide variety of applications. For example, such polymer structures may be included in skin grafts, vascular grafts, articular cartilage grafts, micro-fluidic devices, drug delivery devices, or tissue engineering devices. A micro-fluidic device that has interconnections between layers can be fabricated. Examples include 3-D DNA sequencing devices, 3-D cell manipulation devices, electrophoretic devices, and lab-on-a-chip devices. Various tissue scaffolds with properly interconnected geometries (e.g., cavities or channels) for nutrient supply can be constructed. In particular tissue scaffolds (or artificial tissues) having layered structures, such as skin grafts, vascular grafts, and articular cartilage grafts, can be constructed effectively. Micro-patterns in a polymer structure can also provide methods for including and organizing drugs spatially so that drug release can be controlled geometrically.

The invention claimed is:

1. A method of fabricating a patterned polymer layer, the method comprising:
   a) positioning said polymer layer between a patterned mold and a substrate, wherein said mold and said substrate have substantially different hardnesses, and wherein said polymer layer has a thickness T;
   b) compression molding a pattern having at least one through hole into said polymer layer by pressing said mold and said substrate together;
   wherein said mold together with said substrate comprises a plurality of unit cells, each having a cell area A, a cell volume V, an occupied cell volume $V_{oc}$ and an unoccupied cell volume equal to $V-V_{oc}$;
   wherein substantially all of a surface of said mold facing said polymer layer is included in said unit cells, and wherein none of said unit cells includes two or more through hole features;
   wherein a condition $A*T \leq V-V_{oc}$ holds for each of said unit cells;
   whereby room for local flow of said polymer during said compression molding is provided.

2. The method of claim 1, wherein said mold comprises a feature for forming said at least one through hole or for forming a blind hole, and wherein said feature has a cross section selected from the group consisting of square, rectangular, circular, and elliptical cross sections.

3. The method of claim 1, wherein said mold comprises a feature for forming said at least one through hole, and wherein said feature comprises a flat top, a conical top, a tapered top section with a flat top surface, or a tapered top section having a sharp outer edge.

4. The method of claim 1, wherein said compression molding is performed at a temperature above a glass transition temperature of said polymer and below a melting temperature of said polymer.

5. The method of claim 1, wherein said mold is harder than said substrate.

6. The method of claim 1, wherein said mold and said substrate are disposed on substantially planar supporting surfaces.

7. The method of claim 1, wherein said mold and said substrate are disposed on substantially cylindrical supporting surfaces.

8. The method of claim 1, further comprising incorporation of one or more inclusions within said pattern.

9. The method of claim 8, wherein said inclusions comprise a bio-active material, one or more bio-active devices, a non bio-active material, or one or more non bio-active devices.

10. The method of claim 1, further comprising treating said mold with a low surface energy surfactant, whereby release of said polymer from said mold is facilitated.

11. The method of claim 1, wherein said mold comprises a lithographically patterned Silicon structure, a micro-patterned metal structure, or a micro-patterned polymer structure.

12. The method of claim 1, further comprising providing electrical connections to features of said pattern.

13. A polymer layer having a pattern provided according to the method of claim 1.

14. The polymer layer of claim 13, wherein said at least one through hole is a tapered through hole.

15. The polymer layer of claim 13, wherein said at least one through hole has a lateral feature size of less than about 100 μm.

16. The polymer layer of claim 13, wherein said pattern includes at least one blind hole in addition to said at least one through hole.

17. The polymer layer of claim 16, wherein said blind hole has a cross section selected from the group consisting of square, rectangular, circular and elliptical cross sections.

18. The polymer layer of claim 13, wherein said thickness T is in a range from about 1 μm to about 200 μm.

19. The polymer layer of claim 13, wherein said polymer comprises a polymer selected from the group consisting of: biodegradable polymers; thermoplastic polymers; polylactides; polyglycolides; poly methyl methacrylates; aliphatic poly ester; poly-caprolactone; poly-anhydrides; poly ortho esters; alkaly derivatives of Trimethylenecarbonate; δ-valerolactone; β-butyrolactone; γ-butyrolactone; ε-decalactone; hydrocybutyrate; hydroxyvalerate; 1,4-dioxepan-2-one; 1,5,8,12-tetraoxacyclotetradecane-7,14-dione; 1,5-dioxepan-2-one; 6,6-dimethyl-1,4-diocan-2-one; and mixtures or co-polymers thereof.

20. The polymer layer of claim 13, wherein said pattern has a density of through holes in a range from about $1/mm^2$ to about $40,000/mm^2$.

21. A method of fabricating a three-dimensionally patterned polymer structure, the method comprising:
   a) fabricating a plurality of patterned polymer layers according to the method of claim 1; and
   b) bonding said plurality of polymer layers together to form a three-dimensional pattern in said three-dimensional structure.

22. The method of claim 21, wherein said bonding comprises solvent bonding, solvent vapor bonding, flash thermal bonding, adhesive bonding, mechanical interlock bonding, plasma bonding or ultrasonic bonding.

23. The method of claim 21, wherein a gradient of microstructures in said pattern is established within said three-dimensional structure.

24. The method of claim 23, wherein said gradient is parallel to or perpendicular to a plane of said layers.

25. The method of claim 21, further comprising incorporation of one or more inclusions within said three-dimensional pattern.

26. The method of claim 25, wherein said inclusions comprise a bio-active material, one or more bio-active devices, a non bio-active material, or one or more non bio-active devices.

27. The method of claim 26, wherein a gradient of said inclusions is established within said three-dimensional structure.

28. The method of claim 27, wherein said gradient is parallel to or perpendicular to a plane of said layers.

29. The method of claim 21, further comprising registering said patterned polymer layers precisely to each other.

30. A polymer structure having a three-dimensional pattern provided according to the method of claim 21.

31. The polymer structure of claim 30, wherein said structure comprises a micro-fluidic device, a drug delivery device, or a tissue engineering device.

* * * * *